(12) United States Patent
He (10) Patent No.: US 10,037,584 B2
(45) Date of Patent: Jul. 31, 2018

(54) OBTAINING SOCIAL RELATIONSHIP TYPE OF NETWORK SUBJECTS

(71) Applicant: Alibaba Group Holding Limited, Grand Cayman (KY)

(72) Inventor: Huimei He, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 321 days.

(21) Appl. No.: 14/605,803

(22) Filed: Jan. 26, 2015

(65) Prior Publication Data

US 2015/0213111 A1    Jul. 30, 2015

(30) Foreign Application Priority Data

Jan. 27, 2014  (CN) .......................... 2014 1 0039873

(51) Int. Cl.
*G06F 17/30* (2006.01)
*G06Q 50/00* (2012.01)

(52) U.S. Cl.
CPC ......... *G06Q 50/01* (2013.01); *G06F 17/3053* (2013.01)

(58) Field of Classification Search
CPC ............................ G06Q 50/01; G06F 17/3053
USPC ................................................. 707/748, 758
See application file for complete search history.

(56) References Cited

U.S. PATENT DOCUMENTS

| 6,745,184 | B1 | 6/2004 | Choi et al. |
| 7,613,769 | B1 | 11/2009 | Hess |
| 7,716,140 | B1 * | 5/2010 | Nielsen ............... G06F 21/6245 705/319 |
| 7,788,292 | B2 | 8/2010 | Kolcz et al. |
| 8,090,665 | B2 * | 1/2012 | Yang ..................... G06N 7/005 705/319 |
| 8,285,719 | B1 | 10/2012 | Long et al. |
| 8,756,164 | B1 | 6/2014 | Smith et al. |
| 8,756,304 | B2 * | 6/2014 | Leacock .............. H04L 51/043 709/203 |
| 8,788,541 | B1 | 7/2014 | Goldman |
| 9,813,522 | B2 * | 11/2017 | Van Wie ............... G06Q 10/10 |
| 2005/0171832 | A1 | 8/2005 | Hull et al. |
| 2010/0100494 | A1 | 4/2010 | Polo-Malouvier et al. |

(Continued)

OTHER PUBLICATIONS

PCT Search Report and Written Opinion dated Apr. 221, 2015 for PCT application No. PCT/US2015/12933, 11 pages.

*Primary Examiner* — Phong H Nguyen
(74) *Attorney, Agent, or Firm* — Lee & Hayes, PLLC (57) ABSTRACT

Social network behavior data of two network subjects whose social relationship type is required to be determined is obtained. The network social behavior data of the two network subjects to be determined is discretized by a preset manner in such a way that each of the social behavior is discretized into N levels according to a quantity of each social network behavior. A merged probability of each social relationship type to which the two network subjects belong is calculated according to a conditional probability that each level of network social behavior corresponds to each social relationship type. A social relationship type having the largest merged probability is initially determined as a social relationship type of the two network subjects. The present techniques effectively utilized network social behavior data, implement determination of social relationship type, and improve user network experiences.

20 Claims, 3 Drawing Sheets

(56) References Cited

U.S. PATENT DOCUMENTS

| | | | |
|---|---|---|---|
| 2010/0146118 A1* | 6/2010 | Wie | H04L 67/306 |
| | | | 709/225 |
| 2011/0314017 A1 | 12/2011 | Yariv et al. | |
| 2012/0066306 A1* | 3/2012 | Leacock | H04L 51/043 |
| | | | 709/204 |
| 2012/0209917 A1 | 8/2012 | Hacid et al. | |
| 2013/0080467 A1 | 3/2013 | Carson et al. | |
| 2013/0151997 A1* | 6/2013 | Migoya | G06F 3/0484 |
| | | | 715/760 |
| 2013/0202210 A1* | 8/2013 | Ryoo | G06K 9/00771 |
| | | | 382/195 |
| 2014/0095689 A1* | 4/2014 | Borgs | G06F 17/30958 |
| | | | 709/224 |
| 2014/0150068 A1 | 5/2014 | Janzer | |
| 2016/0180386 A1* | 6/2016 | Konig | G06Q 30/0255 |
| | | | 705/14.55 |

* cited by examiner

OBTAINING SOCIAL RELATIONSHIP TYPE OF NETWORK SUBJECTS

CROSS-REFERENCE TO RELATED PATENT APPLICATIONS

This application claims foreign priority to Chinese Patent Application No. 202410039873.3 filed on Jan. 27, 2014, entitled "Method and Apparatus for Obtaining Social Relationship Type of Network Subjects," which is hereby incorporated by reference in its entirety.

TECHNICAL FIELD

The present disclosure relates to network technology, and, more particularly, to a method and an apparatus for obtaining a social relationship type of network subjects.

BACKGROUND

With the development of the Internet, the Internet has been developed as a platform that integrates data of communication, information, entertainment, searching, e-commerce, office collaboration, and enterprise services. A platform with such diversified functions is thus required to create a relationship among users.

In the existing technology, every website has its user group, and the relationships among users of the website user groups constitute a network. The dynamic relationships among the users may be further used to create a relationship model. When the user relationship model is created, usually a matching operation between users is performed by applying an algorithm. Thereafter, a user relationship is created through a process of mutual recommendation among the potential users whose mutual relationship matching degree is high according to a matching operation result. However, this kind of relationship is created only after the user's mutual approval such that one user initializes a friend relationship request and then another user approves that request to create the friend relationship model.

However, with the development of the Internet, the mutual behaviors among network users have become more frequent, and the kinds of mutual behaviors have also become more diversified. A user probably has dozens or hundreds of contacts and there may be several different social relationship types among the user and the contacts. Therefore, the scheme of creating a relationship applied by the existing technology is unable to obtain a real relationship among users as the existing technology requires the user to voluntarily provide mutual social relationship information, and the existing technology will decrease the participation desire if the user has to go through a very complicated selection process to select a relationship classification. Therefore, the existing technology cannot effectively explore the social relationship in connection to network users by which a real complex degree of users' relationship types is not reflected. The existing technology thus causes an e-commerce provider or merchant to be unable to fully control the information of the complex degree of the mutual relationship types among the network subjects and decreases the accuracy of performing all kinds of e-commerce operations. Another major disadvantage of the existing technology is the low efficiency when a social relationship has to be confirmed by a user's voluntarily approval operation. In summary, the above described technologies not only affect searching for target customers in a social network-based e-commerce, but also hurt the users' network experiences.

Thus, to provide a technique for automatically creating user relationships according to behaviors among users has become an urgent technical problem to be resolved.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-executable instructions as permitted by the context above and throughout the present disclosure.

The present disclosure provides example methods and apparatuses for obtaining a social relationship type of network subjects. The method and apparatus of the present disclosure provide abundant information with regard to the social relationship types in connection to network subjects and alleviates the need of mutual operation during a process of determining the social relationship type.

The present disclosure provides an example method for obtaining a social relationship type of network users:

Social network behavior data of two network subjects whose social relationship type is required to be determined is obtained. A number of the network social relationship types is M, and a number of the network social behavior types is S. The network social behavior data of the two network subjects to be determined is discretized by a preset manner in such a way that each of the social behavior type is discretized into N levels according to a quantity of each social network behavior. A merged probability of each social relationship type to which the two network subjects belong is calculated according to a conditional probability that each level of network social behavior type corresponds to each social relationship type. A social relationship type having the largest merged probability is determined as an initial estimate of a social relationship type of the two network subjects.

For example, the conditional probability that each level of network social behavior type corresponds to each social relationship type may be obtained by: obtaining network subject data of known social relationship types and the social network behavior data of such network subjects as an initial sample data set, discretizing such S kinds of network social behavior types within a quantity range by a preset manner in such a way that each network social behavior type is classified into N levels according to a number of occurrences, and calculating a conditional probability that each level of network social behavior type corresponds to each social relationship type according to known data of the initial sample data set.

For example, if a merged probability value of the social relationship type with the largest merged probability is larger than a preset threshold value $\alpha$, then the two network subjects are determined to have the social relationship type.

For example, an estimated result that estimates a social relationship type requires a required accuracy such as an accuracy requirement percentage $\beta$. With respect to the initial sample data set, a merged probability of any two network subjects in the initial sample data set is calculated. A particular value $\alpha_1$ is chosen as an hypothetical threshold value for the preset threshold value. A social relationship type is estimated based on the hypothetical threshold value. An accuracy percentage of the estimated result is obtained by comparing the estimated result with real data in the initial sample data set. When a particular value $\alpha_1$ is used and the accuracy percentage of the estimated result of the obtained social relationship type is equal to or slightly larger than $\beta$, then the particular value $\alpha_1$ is used as the preset threshold value $\alpha$.

For example, each network social behavior weight of the network subject a is multiplied with a frequency corresponding to each network behavior type, and such products are added to obtain a social relationship strength index of a network subject b in relation to or relative to a.

For example, the network social behavior weight is calculated by using a following formula:

$$\langle \text{social network behavior weight} \rangle = \log \frac{\text{total network subjects contacted by a}}{\sum_{x=B}^{x} [\text{if } \langle a, x \rangle \text{ is involved in } k, \text{ then '1' else '0'}]}$$

For example, the network social behavior frequency is calculated by using a following formula:

$$\langle \text{network social behavior frequency} \rangle = \frac{\log Num \langle a, b \rangle [k]}{\log \sum_{x=b}^{x} \sum_{k=0}^{n} Num \langle a, x \rangle [k]}$$

a is a network subject. n is a total number of social behavior types between the networks subjects a and b. A frequency is a number of occurrence times of a particular social behavior between the network subjects a and b. In a calculation of the network social behavior weights, the denominator represents a number of contacts with which a has a social behavior k. In the formula of the network social behavior frequency, Num<a, b>[k] represents a number of interaction times of the social behavior k between the network subjects a and b, and an antilogarithm portion of the denominator represents a total occurrence times between the network subject a and all other network subjects.

For example, the social relationship type between the network subjects a and b is further classified into a subtype according to a data range of the obtained social relationship strength between the network subjects a and b in combination with specific types and quantities of network social behaviors and the respective related information of the network subjects a and b.

The present disclosure also provides an example apparatus for obtaining a social relationship type in connection to network users. The apparatus may include the following units.

An obtaining unit obtains social network behavior data of two network subjects whose social relationship type is required to be determined. A number of the network social relationship types is M, and a number of the network social behavior types is S. A discretizing unit discretizes the network social behavior data of the two network subjects to be determined by a preset manner in such a way that each of the social behavior type is discretized into N levels according to a quantity of each social network behavior type. A calculating unit calculates a merged probability of each social relationship type to which the two network subjects belong according to a conditional probability that each level of network social behavior type corresponds to each social relationship type. An initial estimating unit chooses a social relationship type having the largest merged probability as a social relationship type, according to a merged probability that the two network subjects belong to each social relationship type, and determines such social relationship type as an initial estimate of the social relationship type of the two network subjects.

For example, the apparatus may also include an initial sample data set obtaining unit, a level dividing unit, and a conditional probability calculating unit. The initial sample data set obtaining unit obtains network subject data of known social relationship types and the social network behavior data of such network subjects as an initial sample data set. The level dividing unit discretizes such S kinds of network social behavior types within a quantity range by a preset manner in such a way that each network social behavior type is classified into N levels according to a number of occurrences. The conditional probability calculating unit calculates a conditional probability that each level of network social behavior type corresponds to each social relationship type according to known data of the initial sample data set.

For example, the apparatus may also include a final estimating unit that receives the social relationship type estimated by the initial determining unit and determines such social relationship type as a final estimate of the social relationship type between the two network subjects if a merged probability value of such social relationship type is larger than a preset threshold value $\alpha$.

For example, the apparatus may also include a preset threshold value determining unit that receives a required accuracy or an accuracy requirement percentage $\beta$ of an estimated result of the social relationship type and determines a value of preset threshold value $\alpha$ based on the accuracy requirement percentage $\beta$. The example method is as follows. Data of the initial sample data set is obtained. With respect to the initial sample data set, a merged probability of any two network subjects in the initial sample data set is calculated. A particular value $\alpha_1$ is chosen as an hypothetical threshold value for the preset threshold value. A social relationship type is estimated based on the hypothetical threshold value. An accuracy percentage of the estimated result is obtained by comparing the estimated result with real data in the initial sample data set. When a particular value $\alpha_1$ is used and the accuracy percentage of the estimated result of the obtained social relationship type is equal or slightly larger than $\beta$, then the particular value $\alpha_1$ is used as the preset threshold value $\alpha$.

For example, the apparatus may also include a strength calculating unit that, according to the final estimate of the social relationship between the network subjects a and b, multiplies each network social behavior weight of the network subject a and a frequency corresponding to the respective network social behavior, and adds the products to obtain a social relationship strength index of the network subject b in relation to a.

For example, the apparatus may also include a weight calculating unit and a frequency calculating unit. For instance, the weight calculating unit may calculate the network social behavior weight by using the following formula:

$$\langle \text{social network behavior weight} \rangle = \log \frac{\text{total network subjects contacted by a}}{\sum_{x=B}^{x} [\text{if } \langle a, x \rangle \text{ is involved in } k, \text{ then '1' else '0'}]}$$

For instance, the frequency calculating unit may calculate the network social behavior frequency by using the following formula:

$$\langle\text{network social behavior frequency}\rangle = \frac{\log Num\langle a, b\rangle[k]}{\log \sum_{x=b}^{x}\sum_{k=0}^{n} Num\langle a, x\rangle[k]}$$

a is a network subject. n is a total type number of social behaviors between the networks subjects a and b. A frequency is a number of occurrence times of a particular social behavior between the network subjects a and b. In a calculation of the network social behavior weights, the denominator represents a number of contacts with which the network subject a has a social behavior k. In the formula of the network social behavior frequency, Num<a, b>[k] represents a number of interaction times of the social behavior k between the network subjects a and b, and an antilogarithm portion of the denominator represents a total mutual occurrence times between the network subject a and all other network subject contacts.

For example, the apparatus may further include a social relationship classifying unit that further classifies the social relationship type between the network subjects a and b into a subtype, according to a data range of the social relationship strength between the network subjects a and b received from the strength calculating unit in combination with specific types and quantities of network social behaviors and the respective related information of the network subjects a and b.

The present techniques discretize the obtained network social behavior data of two network subjects to be determined by a predetermined manner such that each network social behavior type is discretized into N levels, calculate a merged probability of each social relationship type to which two network subjects belong according to a conditional probability that each level of network social behavior type corresponds to each social relationship type, and choose a social relationship type having the largest merged probability as a social relationship type to which the two network subjects belong. As shown, during a process of ultimately determining the social relationship type, the social relationship type of two network subjects is determined based on the largest calculated merged probability of a specific social relationship rather than a mutual approval between the two network subjects. Therefore, the determined social relationship type of the present disclosure may fully reflect the real existing complex social relationship type between the two network subjects, and the present techniques overcome a limitation that a user has to voluntarily provide mutual social relationship information as required in the existing technology. Since the present techniques calculate a merged probability of each social relationship type to which the network subjects belong according to a conditional probability that each level of network social behavior type corresponds to a specific social relationship type and further determine a social relationship type between the two network subjects, it is not necessary for the present techniques to have a user participation so that the present techniques have high efficiency and cover abundant social relationship types. By using the methods provided by the present disclosure, the present techniques efficiently use network social behavior data, achieve the determination of a social relationship type, and improve user experiences of a network service.

BRIEF DESCRIPTION OF THE DRAWINGS

In order to clearly explain the technical means of the present disclosure, the below briefly explains the drawings of the present disclosure. As shown, the drawings are only used to illustrate example embodiments of the present disclosure. A person having ordinary skill in the art is able to obtain other drawings based on these drawings.

DETAILED DESCRIPTION

The technical solutions of the present disclosure are illustrated as below with the accompanying FIGs in the example embodiments. Apparently the example embodiments here are just portions of instead of all embodiments of the present disclosure. The other embodiments obtained by a person having ordinary skill in the art are within the scope of the present disclosure.

Figure 1:
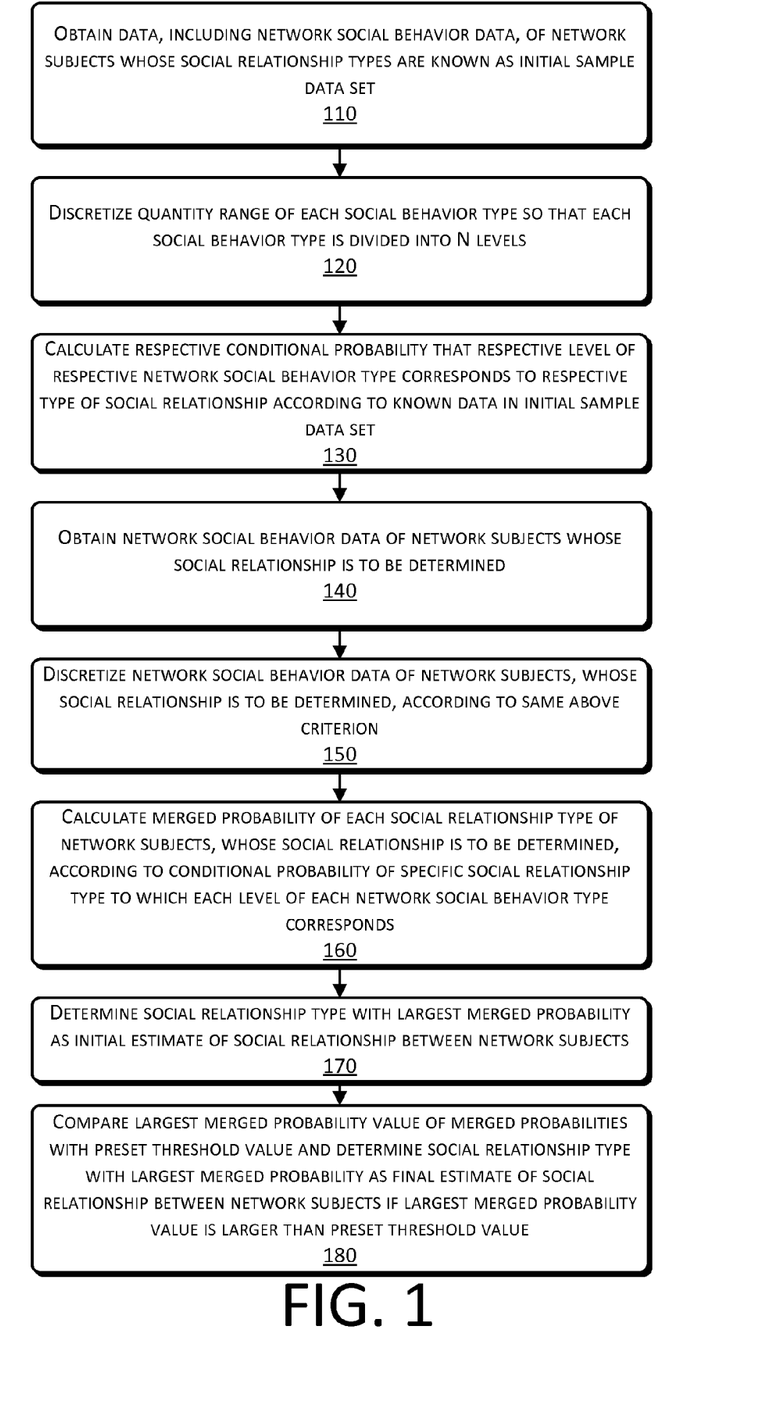
FIG. 1 is a flowchart illustrating an example method for obtaining a social relationship type between network subjects according to the present disclosure.

FIG. 1 is a flowchart showing an example method for obtaining a social relationship type among network subjects according to the present disclosure. The method includes the following operations.

At 110, existing data, including existing network social behavior data, of network subjects whose social relationship types are known is obtained as initial sample data set. For example, a number of the network social relationship types is M, and a number of the network social behavior types is S.

The network subject of the social relationship type at 110 may be a user. The M kinds of social relationship types may be a friend relationship type, a classmate relationship type, a relative relationship type, a colleague relationship type and so on. A network social behavior may be an interactive behavior such as behaviors of card transaction, money refilling on behalf of others, transaction on behalf of others, money paying for others' mobile phone, registration of multiple accounts by one identical machine and so on. The interactive relationships among the network subjects and the types and amounts of the network social behaviors are used as are initial samples for analysis and then the initial sample data set is finally formed. The initial sample data set may be understood as data which is known. This example embodiment of the present disclosure estimates unknown situations by using the obtained known data. More specifically, the present techniques use the initial sample set in which both the social relationship type and network social behavior are known to estimate an unknown social relationship type between other network subjects between which there are recorded network social behaviors.

At 120, a quantity range of each of the social behavior type is discretized so that each social behavior type is divided into N levels.

This step is to discretize data amount of the known network social behavior data, and the discretized data is classified into multiple different levels for each social behavior type. For example, a range of occurrence times of money paying for others' mobile phone is estimated within 30 times and it is rate that the occurring times is over 30. Then the occurrence times may be discretized into 6 levels including 0, 1-2, 3-5 6-15, 21-25, and 26 to more. Each level may have a corresponding frequency description, such as the terms of never, seldom, sometimes, often, frequent, and very frequent. The social behavior is not limited to money paying for others' mobile phone. Other different network social behaviors may be discretized according to their specific statistic data. That is, every different network social behavior type has its different discretizing criterion.

At 130, a conditional probability that each level of each network social behavior type corresponds to a particular type of social relationship is calculated according to the above known information such as those in the initial sample data set.

At this step, a conditional probability that a specific level of a specific social behavior type corresponds to a specific social relationship type is calculated according to known social relationship types among the network subjects and levels of different kinds of network social behaviors among the network subjects. For example, a behavior of paying money for others' mobile phone is in a level of "frequent" and a probability of a social relationship between the network subjects is relatives, friends, classmates, colleagues is obtained based on data records of the known initial sample data set. For example, in the initial sample data set, there are 20 pairs of network subjects whose social behaviors are "frequently" paying money for others' mobile phone, in which there are 12 pairs are relatives. Thus, the conditional probability for a social behavior of paying money for others' mobile phone at a level of "frequent" with a relationship of "relatives" is 60%, i.e., 12/20. The above conditional probability is obtained based on real data records of the initial sample data set.

In this example embodiment, in a situation where there are 4 relationship types, 5 network social behavior types, and each network social behavior type has 6 levels, the obtained data may be represented by a 30*4 matrix, wherein the 30 rows from top to bottom represent 6 levels of the 5 network social behavior types, and the 4 columns represent the 4 social relationship types. It is noted that the above mentioned is only an example for recording the related data. Other methods may be applied as well.

The above 3 steps are to obtain the conditional probability of a specific social relationship type to which each level of each social network behavior type corresponds according to the known data. However, a method for obtaining the conditional probability is not limited to those described herein. For example, the conditional probability may be manually set based on experience data.

At 140, network social behavior data of two network subjects, whose social relationship is to be determined, is obtained.

In this step, for example, there are 5 network social behavior types including a card transaction with a reference alphabet A, money filling on behalf of others or money paying on behavior of others with a reference alphabet B, transaction on behalf of others with a reference alphabet C, money paying for others' cell phone with a reference alphabet D, and registration of multiple accounts by an identical machine with a reference alphabet E. The 5 network social behavior data between the two network subjects may be obtained through network service records.

At 150, the network social behavior data of the network subjects, whose social relationship is to be determined, is discretized according to the same criterion as mentioned above.

The same criterion as mentioned above refers to the discretizing criterion provided for each network social behavior at 130. The same discretizing criterion provide same basis of the following calculation steps.

At 160, a merged probability of each social relationship type of the two network subjects, whose social relationship is to be determined, is calculated according to a conditional probability of a specific social relationship type to which each level of each network social behavior type corresponds.

For example, in the calculation of the merged probability at 160, a merged probability formula based on Bayes' Theorem is as follows:

$$P(A \mid B) = P(B \mid A) * P(A) / P(B)$$

$$P(X/ABCDE) = \frac{P(ABCDE/X) * P(X)}{P(ABCDE)} =$$

$$\frac{P(A/X) * P(B/X) * P(C/X) * P(D/X) * P(E/X) * P(X)}{P(A) * P(B) * P(C) * P(D) * P(E)} =$$

$$\frac{P(X/A) * P(X/B) * P(X/C) * P(X/D) * P(X/E)}{P(X) * P(X) * P(X) * P(X)}$$

In the above formula, A, B, C, D and E respectively represent the 5 network social behavior types, i.e., a mutual behavior of a card transaction, money filling on behalf of others or money paying on behalf of others, transaction on behalf of others, credit filling for a cell phone on behalf of others, and registration of multiple accounts by an identical machine. The conditional probability of the 5 network social behavior types in term of P(X/A), P(X/B), P(X/C), P(X/D), P(X/E) is respectively obtained at 130 according to a discretized level of the network social behavior data among the network subjects to be determined. P(X) is an initial probability of a specific social relationship type among network subjects, and the initial probability P(X) is a probability of a specific social relationship type between any two network subjects without considering any network social behavior.

The merged probability of each social relationship type to which the network subjects belong is calculated through the above formulas based on the known information. That is, the present techniques calculate a merged probability of classmate relationship, a merged probability of colleague relationship, a merged probability of relative relationship, and a merged probability of friend relationship to which the network subjects belong, according to the 5 network social behaviors.

At 170, the social relationship type with the largest merged probability is determined as an initial estimate of the social relationship between the network subjects.

At 160, the present techniques calculate a respective merged probability of a respective social relationship type to which two network subjects belong, and the calculated merged probability for each social relationship type may be different from each other. There is a merged probability with a largest merged probability value. The social relationship type with the largest merged probability is an initial estimate of a social relationship type to which the two network subjects belong.

At 180, the largest merged probability value of the merged probabilities is compared with a preset threshold value a. If the largest merged probability value is larger than the preset threshold value a, the social relationship type corresponds to the largest merged probability value is a final estimate of the social relationship type to which the network subjects belong.

When the social relationship type having the largest merged probability is determined as the social relationship type to which of the two network subjects belong, there may be a problem of deviation between the estimated social relationship type and the real social relationship type. In order to increase an accuracy percentage of social relationship type estimation, a merged probability preset threshold value α may be preset to increase the accuracy. For example, the merged probability value of the social relationship type having the largest merged probability is compared with the preset threshold value α. If the merged probability value is larger than the preset threshold value, then the social relationship type is ultimately determined as a social relationship type to which the two network subjects belong. Since the preset threshold value has been determined, in a situation that the largest merged probability between the two network subjects is very low, the social relationship corresponding to the largest merged probability is not determined as the social relationship type to which the two network subjects belong to prevent from such problem caused by the initial estimate.

The preset threshold value α may be configured according to experiences. Alternatively, the preset threshold value α may be configured by calculation using the initial sample data set.

Figure 2:
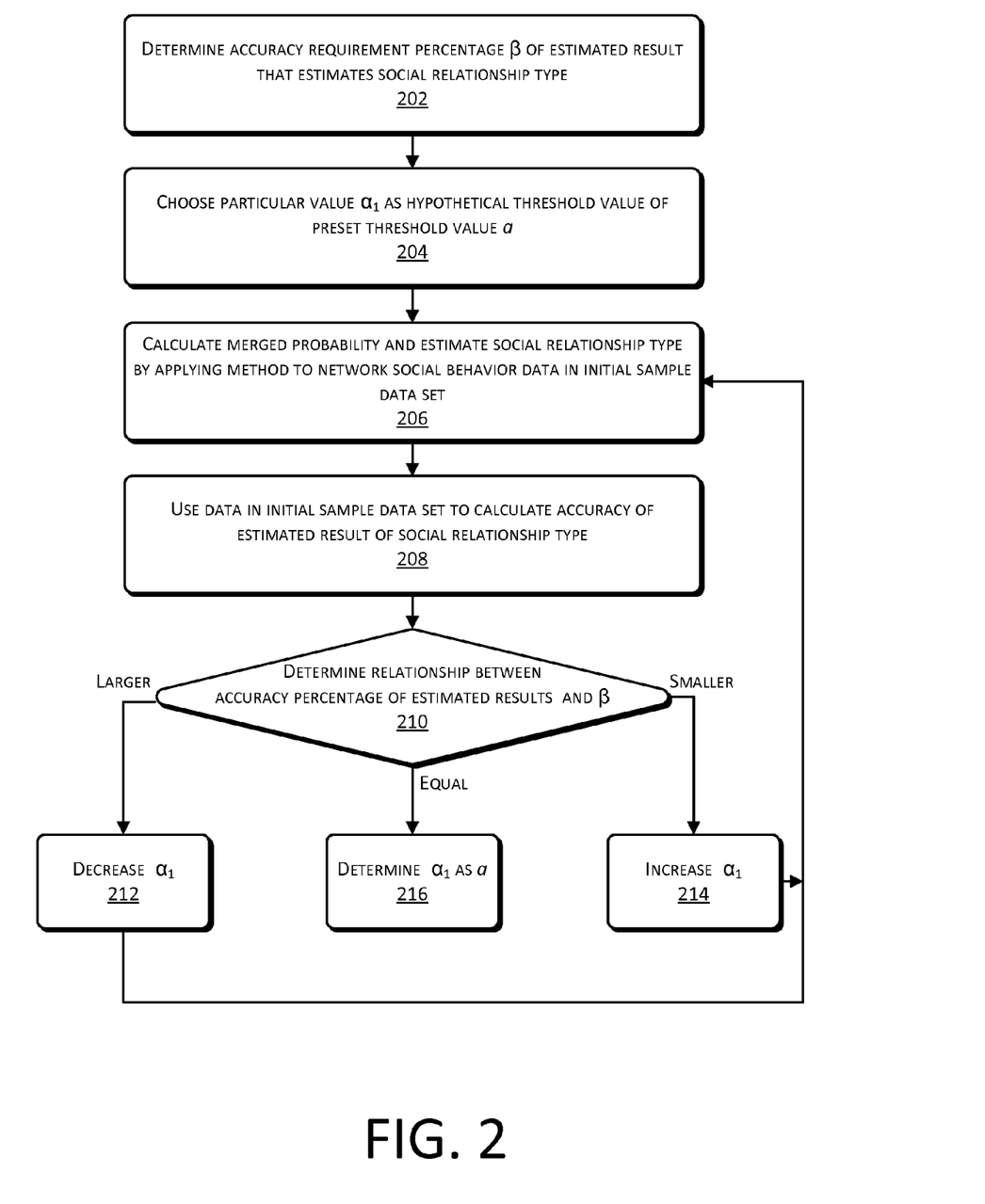
FIG. 2 is a flowchart illustrating an example method for determining a threshold value when obtaining a social relationship type between network subjects according to the present disclosure.

FIG. 2 is a flowchart illustrating an example process for determining a threshold value with respect to the method for obtaining a social relationship among network subjects.

At 202, a required accuracy or an accuracy requirement percentage β of an estimated result that estimates a social relationship type is determined. The accuracy requirement percentage β is a criterion that an accuracy percentage of an estimated social relationship type should exceed. For example, if an accuracy requirement percentage β=90% is determined and there are 100 pairs of network subjects whose social relationship types are estimated as relative relationship, while there are 91 pairs of network subjects that really have the relative relationship, the estimated result satisfies the criterion, i.e., 91%>90%. On the other hand, if there are only 89 pairs of the 100 pairs that really have the relative relationship, the estimated result does not satisfy the criterion. The accuracy requirement percentage β may be served as an index for measuring the preset threshold value α. That is, the obtained ultimately determined result should exceed to or be equal to the accuracy requirement percentage β after the preset threshold value α is determined. The accuracy requirement percentage β is a human requirement and may be set by a user's requirement.

At 204, a particular value $\alpha_1$ is chosen as a hypothetical threshold value for the preset threshold value α.

The particular value $\alpha_1$ is only a test value to be tested for calculating.

At 206, a merged probability is calculated and a social relationship type is estimated by applying the above mentioned method to the network social behavior data in the initial sample data set.

At 206, the social relationship types among network subjects in the initial sample data set are assumed as unknown, and their social relationship types are estimated based on their social behaviors. The estimating method is as described above in FIG. 1. In the estimating process, when operations at 180 are performed, the particular value $\alpha_1$ is configured as the preset threshold value α. An estimated result of all social relationship types among all network subjects in the initial sample data set may be obtained by the above process.

At 208, the data in the initial sample data set is used to calculate an accuracy of the estimated result of the social relationship type obtained from 206.

As the estimated result of the social relationship type among network subjects at 206 is obtained based on the initial sample data set, in which the data is known data, i.e., the social relationship types among the network subjects in the initial sample data set are known, the accuracy percentage of the estimated result of the social relationship type is verified.

For example, in a situation that the estimated results include social relationship types among 100 pairs of network subjects, if the social relationship types among 90 pairs are determined correctly by using the relationship data among the network subject in the initial sample data set, then the accuracy percentage is 90%.

At 210, a relationship between the accuracy percentage of the estimated results of the social relationship types at 208 and the accuracy requirement percentage β is determined. If the two are substantially equal, then the process proceeds to 216. If the accuracy percentage of the obtained social relationship type is larger than the accuracy requirement percentage β, then the process proceeds to 212. If the accuracy percentage of the obtained social relationship type is smaller than the accuracy requirement percentage β, then the process proceeds to 214.

Different processes are executed according to different comparison relationships between the accuracy percentage of the obtained social relationship type and the accuracy requirement percentage β. A different comparison relationship represents a different meaning. If the accuracy percentage of the estimated result and the accuracy requirement percentage are substantially the same, then the particular value $\alpha_1$ is taken as a suitable value and may be used as the preset threshold value. The term of "substantially the same" is defined with a meaning that a difference between two numbers is within a preset range. For example, within a range of 1%, the particular value $\alpha_1$ satisfies the criterion. For instance, if the accuracy requirement percentage β is 90%, and the accuracy percentage, which is obtained by applying the particular value $\alpha_1$ obtained after the determining process of 180 and then performing comparison with the real data in the initial sample data set in 208, is 89.5%, then the particular value $\alpha_1$ is considered as satisfying the criterion as the difference is within the range of ±1%. In order not to waste resources on a repeated loop calculating, the particular value $\alpha_1$ may be used as a suitable preset threshold value.

If the accuracy percentage of the estimated result is obviously larger than the accuracy requirement percentage β, the particular value $\alpha_1$ is then considered as being defined too conservative. In this circumstance, some other really existed social relationships may probably be missing in the consideration, so it is necessary to decrease the particular value $\alpha_1$. The reason that a too large accuracy percentage of an estimated result will not satisfy the requirement is explained as follows. In every different scenario, there are different purposes for obtaining social relationship types, and there are different tolerance degrees for missing social behavior types and misjudging social relationship types. In many situations, obtaining more social relationship types among network subjects may be preferred in spite that there may cause wrong determinations for some social relationship types. Therefore, it is not always desired to have a higher accuracy percentage. Moreover, the estimated result of the social relationship types obtained by the example method of the present disclosure may be not 100% correct so that the example method may have more applicable value if more estimated results are obtained with some misjudgment.

If the accuracy percentage of the estimated result is obviously smaller than the accuracy requirement percentage β, then the particular value $\alpha_1$ is determined as being too small and does not satisfy the criterion. Therefore, in order to increase the accuracy percentage, the particular value $\alpha_1$ is increased.

At 212, the particular value $\alpha_1$ is decreased and the process is returned to 206.

A value for decreasing the particular value $\alpha_1$ may be determined at a reasonable decrement.

At 214, the particular value $\alpha_1$ is increased and the process is returned to 206.

A value for increasing the particular value $\alpha_1$ may be determined at a reasonable increment.

At 216, the particular value $\alpha_1$ is determined as the real value of the preset threshold value $\alpha$.

After the particular value $\alpha_1$ is determined as the real value of the preset threshold value in the above operations, the value may be used in 180.

Some social relationships may have more detailed relationship types. For example, a relative relationship type may be further classified into a parent-child relationship, a spouse relationship, a lover relationship, a sibling relationship and so on after a social relationship between two network subjects is determined as a relative relationship. The determined social relationship type may be further classified based on a social relationship strength between two network subjects after the final estimate of the social relationship type between two network subjects is determined. A social network strength index of the social relationship strength may be determined based on the social network behavior types of the two network subjects, a quantity or frequency of the network social behaviors, and a weighted configuration of the network social behavior types.

A network social behavior creates a relationship among different users, such as a money transfer, money paying on behalf of others, credit filling on behalf of others. A user usually has relationships with other users through multiple network social behaviors. Different kinds of network social behavior types are classified when the social relationship strength between two network subjects is calculated. For example, when a user has a specific network social behavior type with many contacts, then such network social behavior has a low value in determining the user's social relationship with others so that the weight value of such network social behavior is decreased. On the other hand, when a user has another specific network social behavior type with only very few contacts, then such network social behavior has a high value in determining the user's social relationship with others so that the weight value of such network social behavior is increased.

A network social behavior frequency is a number of occurrence times that one user has one specific network social behavior with other contacts. The larger the frequency is, the closer the relationship between the two users under such network social behavior is, and the larger the social relationship strength is.

In some kinds of network social behaviors, there may be other indexes to measure the relationship strength. For example, in a circumstance that relates to money, the transaction money amount and the transaction date from now may also be considered in addition to the network social behavior frequency.

When a relationship strength between users is calculated, the calculation is related to relativity. That is, the relationship strength of a user a in relation to a user b is different from the relationship strength of a user b in relation to a user a. For example, a relationship strength of the user b to the user a may be calculated by use of the following formulas:

$$\text{Strength} \langle a, b \rangle = \sum_{k=0}^{n} \langle \text{network social behavior weight} \rangle \times \langle \text{network social behavior frequency} \rangle$$

$$\langle \text{social network behavior weight} \rangle = \log \frac{\text{total network subjects contacted by a}}{\sum_{x=B}^{X} [\text{if } \langle a, x \rangle \text{ is involved in } k, \text{ then '1' else '0'}]}$$

$$\langle \text{social network behavior weight} \rangle = \log \frac{\text{total network subjects contacted by a}}{\sum_{x=B}^{X} [\text{if } \langle a, x \rangle \text{ is involved in } K, \text{ then '1' else '0'}]}$$

$$\langle \text{network social behavior frequency} \rangle = \frac{\log Num\langle a, b \rangle[k]}{\log \sum_{x=b}^{x} \sum_{k=0}^{n} Num\langle a, x \rangle[k]}$$

In the above formulas, strength <a, b> represents a relationship strength index of b to a, and a is a main subject. n is a total type number of social behaviors between the networks subjects a and b. The frequency is a number of occurrence times of a particular social behavior between the network subjects a and b. In a calculation of the network social behavior weights, the denominator represents a number of contacted subjects with which a has the social behavior K. In the formula of the network social behavior frequency, Num<a,b>[k] represents an interactive occurrence times of the social behavior K between the network subjects a and b. An antilogarithm portion of the denominator represents a total interactive occurrence times between the network subject a and all other network subject contacts.

After the above calculation, a social relationship type between the network subjects a and b may be further classified into a sub-type according to a data range of the calculated social relationship strength between the network subjects a and b in combination with the specific types and the quantity of the network social behaviors, and respectively related information of the network subjects a and b. For example, a relationship type between network subjects a and b is a relative relationship type, while there are 25 years of age difference between a and b and a frequent behavior of log-in with the same machine, in combination with the genders of a and b, a subtype relationship such as father-son, father-daughter, mother-son, or mother-daughter may be further determined.

The above is a method for obtaining a social relationship type among network subjects of the present disclosure. As shown, the present disclosure uses the social network behavior data of the network subjects whose social relationship types are known as an initial sample data set, discretizes the network social behavior in the initial sample data set into N levels, and calculates, according to all known information, a conditional probability of one specific social relationship type to which each level of network social behavior corresponds. According to the conditional probability, a merged probability of a specific social relationship type to which the network subjects belong is calculated, and a social relationship type having the largest merged probability is determined as a social relationship type among the network subjects. As shown, the social relationship type of two network subjects is determined as the social relationship type having the largest merged probability rather than a mutual approval between the two network subjects during a process of ultimately determining the social relationship type. Therefore, the determined social relationship type of the present disclosure fully reflects the real existing complex social relationship types between network subjects, and overcome a limitation that requires users to voluntarily provide mutual social relationship information in the existing technology. Since the present techniques estimate the social relationship types of other network subjects according to the known initial sample data set without the necessity to require the participation of the users, the present techniques have high efficiency and cover abundant social relationship types. The present techniques efficiently use network social behavior data to achieve the determination of social relationship types and improve user experiences of network services.

The above-mentioned methods may be combined with some other more instinctive determining methods. For example, when a classmate relationship type is considered, the present techniques may firstly determine whether users as students or not. If they are students, then the present techniques determine if the users study in a same school or not and whether their age difference is less than 5 years. If the answers of these two questions are positive, the present techniques determine that the users have a classmate relationship. For another example, when a colleague relationship is considered, a registered email and a shipping address may be used for determining. For example, if the registered emails and shipment addresses of the users are the same, the users are determined as having a colleague relationship.

During a process of discretizing a network social behavior, the present techniques may not only consider a quantity but also an occurrence time of the social behavior. For instance, if the occurrence times of log-in with the same machine happened one year earlier, then the data of such log-in with the same machine may be discarded.

Moreover, in the above method, the data in the initial sample data set may be changed along with time such that more and more known data is collected. Therefore, according to the changing initial sample data set, a conditional probability of a specific social relationship type to which each level of network social behavior corresponds may be re-calculated to reflect new data collection status. It is noted that with the popularization of the Internet and the joining of users with larger age range, the present techniques may also reflect changing status of relationships between social network behaviors and social relationship types among the network subjects by continuously using the updated initial sample data set for updating the conditional probability. Therefore an evolution process of people's network behaviors is reflected.

The example method of the present disclosure obtains a social relationship type among network subjects. After the social relationship between two networks subjects is determined, a relationship strength of the two network subjects is determined based on social behaviors types and frequency. The estimated social relationship type is further classified based on the relationship strength to obtain a more accurate social relationship type between the two network subjects.

Figure 3:
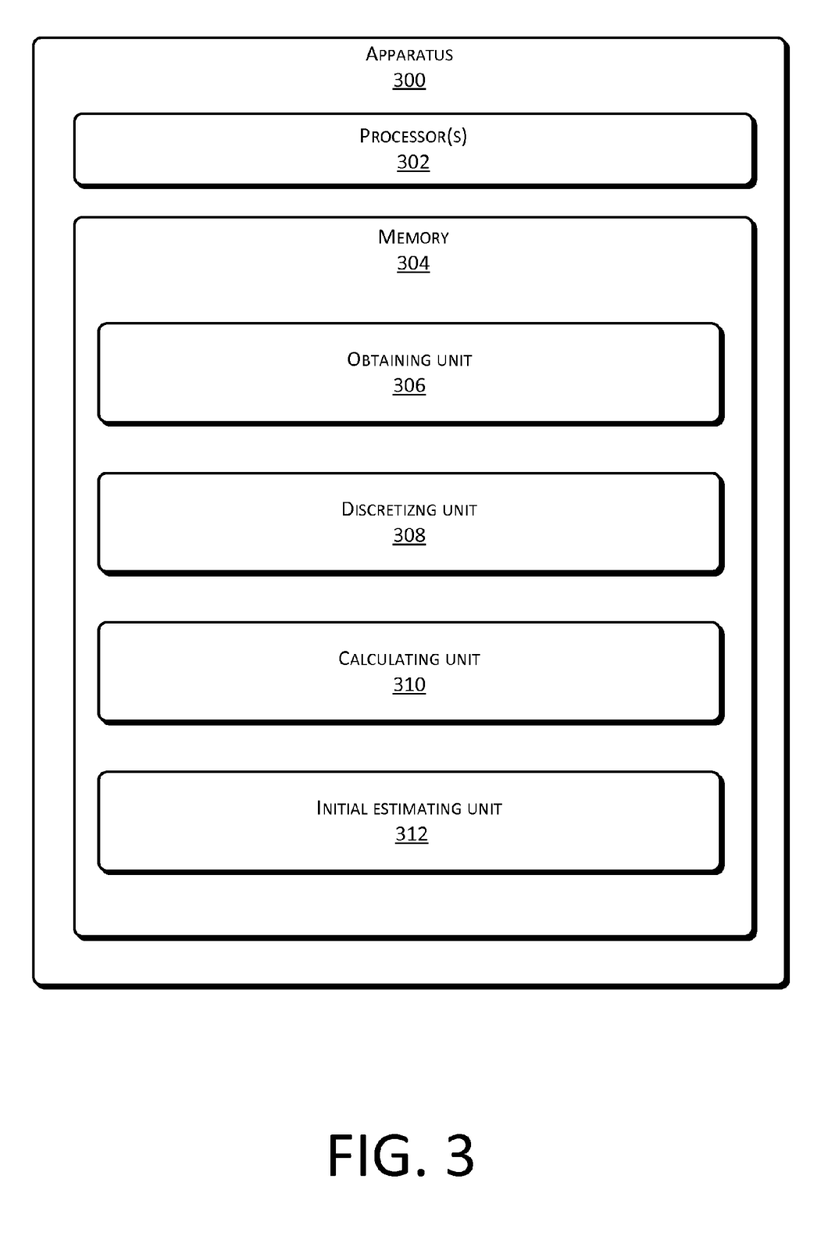
FIG. 3 is a block diagram of an example apparatus for obtaining a social relationship type between network subjects according to the present disclosure.

Corresponding to the example method of the present disclosure for obtaining a social relationship type among network subjects, the present disclosure also provides an example apparatus for obtaining a social relations type among network subjects. FIG. 3 is a block diagram illustrating an example apparatus 300 for obtaining a social relationship type between two network subjects according to the present disclosure. Since the example apparatus embodiment is similar to the example method embodiment, the example apparatus embodiment is described briefly. The relevant portions of the example apparatus embodiment may refer to those of the example method embodiment. The following describe example apparatus embodiment is only for illustration.

The apparatus 300 may include one or more processor(s) or data processing unit(s) 302 and memory 304. The apparatus may further include one or more input/output interfaces, one or more network interfaces (not shown in FIG. 3). The memory 304 is an example of computer-readable media. The memory 304 may store therein a plurality of modules or units including an obtaining unit 306, a discretizing unit 308, a calculating unit 310, an initial estimating unit 312.

The obtaining unit 306 obtains social network behavior data of two network subjects whose social relationship type is required to be determined. A number of the network social relationship types is M, and a number of the network social behavior types is S.

The discretizing unit 308 discretizes the network social behavior data output by the obtaining unit 306 by a preset manner such that each of the social behavior type is discretized into N levels according to a quantity of each social network behavior.

The calculating unit 310 calculates a merged probability of a respective social relationship type to which the two network subjects belong according to a respective conditional probability that a respective level of network social behavior type, obtained by the discretizing unit 308, corresponds to the respective social relationship type.

For example, the apparatus 300 may also include an initial sample data set obtaining unit, a level dividing unit, and a conditional probability calculating unit, all of which are not shown in FIG. 3. The initial sample data set obtaining unit obtains network subject data of known social relationship types and the social network behavior data of such network subjects as an initial sample data set. The level dividing unit discretizes such S kinds of network social behavior types within a quantity range by a preset manner in such a way that each network social behavior type is classified into N levels according to a number of occurrences. The conditional probability calculating unit calculates a conditional probability that each level of network social behavior type corresponds to each social relationship type according to known data of the initial sample data set.

The initial estimating unit 312 chooses a social relationship type having the largest merged probability as a social relationship type from merged probabilities of different social relationship types that the two network subjects belong, and determines such social relationship type as an initial estimate of the social relationship type of the two network subjects.

For example, the apparatus 300 may also include a final estimating unit (not shown in FIG. 3) that receives the social relationship type estimated by the initial determining unit 312 and determines such social relationship type as a final estimate of the social relationship type between the two network subjects if a merged probability value of such social relationship type is larger than a preset threshold value α.

For example, the apparatus 300 may also include a preset threshold value determining unit (not shown in FIG. 3) that adjusts a value of the preset threshold value a. The preset threshold value determining unit receives an accuracy requirement percentage β of an estimated result of the social relationship type and determines a value of preset threshold value α based on the accuracy requirement percentage β. The example method is as follows. Data of the initial sample data set is obtained. With respect to the initial sample data set, a merged probability of any two network subjects in the initial sample data set is calculated. A particular value $\alpha_1$ is chosen as an hypothetical threshold value for a specific preset threshold value. A social relationship type is estimated based on the hypothetical threshold value. An accuracy percentage of the estimated result is obtained by comparing the estimated result with real data in the initial sample data set. When a particular value $\alpha_1$ is used and the accuracy percentage of the estimated result of the obtained social relationship type is equal to or slightly larger than $\beta$, then the particular value $\alpha_1$ is used as the preset threshold value $\alpha$.

For example, the apparatus 300 may also include a strength calculating unit (not shown in FIG. 3) that calculates a social relationship strength index of a network subject b in connection to a. For example, the strength calculating unit may use the following example formula.

$$\text{Strength}\langle a, b\rangle = \sum_{k=0}^{n} \langle\text{network social behavior weight}\rangle \times \langle\text{network social behavior frequency}\rangle$$

For example, the apparatus 300 may also include a weight calculating unit and a frequency calculating unit, both of which not shown in FIG. 3. For instance, the weight calculating unit may calculate the network social behavior weight by using the following formula:

$$\langle\text{social network behavior weight}\rangle = \log \frac{\text{total network subjects contacted by A}}{\sum_{x=B}^{X} [\text{if } \langle a, x\rangle \text{ is involved in } k, \text{ then '1' else '0'}]}$$

For instance, the frequency calculating unit may calculate the network social behavior frequency by using the following formula:

$$\langle\text{network social behavior frequency}\rangle = \frac{\log Num\langle a, b\rangle[k]}{\log \sum_{x=b}^{x} \sum_{k=0}^{n} Num\langle a, x\rangle[k]}$$

a is a network subject. n is a total number of social behavior types between the networks subjects a and b. A frequency is a number of occurrence times of a particular social behavior between the network subjects a and b. In a calculation of the network social behavior weights, the denominator represents a number of contacts with which a has a social behavior k. In the formula of the network social behavior frequency, Num<a, b>[k] represents a number of interaction times of the social behavior k between the network subjects a and b, and the antilogarithm portion of the denominator represents a total mutual occurrence times between the network subject a and all other network subject contacts.

For example, the apparatus 300 may further include a social relationship dividing unit (not shown in FIG. 3) that further classifies the social relationship type after the strength calculating unit calculates the data range of the social relationship strength index. For instance, the social relationship dividing unit receives a data range of the social relationship strength between the network subjects a and b from the strength calculating unit, and further divides the social relationship type into a sub-type according to the data range of the social relationship strength in combination with specific types and quantities of network social behaviors and the respective related information of the network subjects a and b.

Since the example apparatus embodiment is similar to the example method embodiment, the example apparatus embodiment is briefly described in the present disclosure and its relevant portions may refer to corresponding portions in the example method embodiment. The example method and apparatus embodiments herein are only illustrative. Some or all operations or units may be selected upon actual needs to implement the present techniques. A person having ordinary skill in the art may understand and implement the present disclosure without offering any creative effort.

In a standard configuration, a computing device or system as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example method and apparatus for obtaining a social relationship type of network subjects. The present disclosure provides specific examples for illustrating the principles and implementation of the present techniques. The above example embodiments only help understand the principles of the present disclosure. One of ordinary skilled in the art may make any alterations and modifications without departing from the spirit and scope of the present disclosure. Therefore, the descriptions herein shall not be used to limit the present disclosure.

What is claimed is:

1. A method for alleviating a need of mutual operation during a process of determining a social relationship type among network subjects, the method comprising:

obtaining network social behavior data of the network subjects whose social relationship type is to be determined;

discretizing a respective network social behavior type into multiple levels;

calculating a respective weight of the respective network social behavior type based on a ratio of total network subjects contacted by a respective network subject to a number of contacts with which the respective network subject has the respective network social behavior type;

calculating a respective conditional probability that a respective level of the respective network social behavior type corresponds to a respective social relationship type;

calculating a respective merged probability of the respective social relationship type between the network subjects according to the respective conditional probability; and automatically determining a social relationship type based, at least in part, on:
   a largest merged probability as an initial estimate of the social relationship type between the network subjects, and
   the respective weight of the respective network social behavior type.

2. The method as recited in claim 1, wherein the calculating the respective conditional probability comprises:
   obtaining data including existing network social behavior data of existing network subjects whose social relationships are known as an initial sample data set;
   discretizing the respective network social behavior type in the existing network social behavior data into the multiple levels according to a quantity range of the respective network social behavior type in the existing network social behavior data; and
   calculating the respective conditional probability that the respective level of the respective network social behavior type corresponds to the respective social relationship type according to the data in the initial sample data set.

3. The method as recited in claim 2, wherein the quantity range of the respective network social behavior type is a range of a number of occurrence times of the respective network social behavior type.

4. The method as recited in claim 1, further comprising determining the social relationship type with the largest merged probability as a final estimate of the social relationship type between the network subjects in response to determining that the largest merged probability is larger than a preset threshold value.

5. The method as claimed in claim 4, further comprising determining the preset threshold value, the determining including:
   obtaining data including existing network social behavior data of existing network subjects whose social relationships are known as an initial sample data set;
   obtaining a required accuracy;
   calculating a merged probability of respective network subjects in the initial sample data set;
   choosing a particular value as a hypothetical threshold value;
   estimating a social relationship type of the respective network subjects; and
   comparing an estimated result with a real social relationship in the initial sample data set to obtain an accuracy of the estimated result to determine the preset threshold value.

6. The method as recited in claim 5, further comprising using the particular value as the preset threshold value in response to determining that the accuracy of the estimated result is equal to or substantially equal to the required accuracy.

7. The method as recited in claim 5, further comprising decreasing the particular value in response to determining that the accuracy of the estimated result is larger than the required accuracy.

8. The method as recited in claim 5, further comprising increasing the particular value in response to determining that the accuracy of the estimated result is smaller than the required accuracy.

9. The method as recited in claim 1, further comprising calculating a social relationship strength index of a second network subject relative to a first network subject in the respective social relationship type according to the respective weight of the respective network social behavior type and a respective frequency of the respective network social behavior type.

10. The method as recited in claim 9, wherein calculating the respective weight of the respective network social behavior type by using a formula $$\langle \text{social network behavior weight} \rangle = \frac{\log \text{total network subjects contacted by a}}{\sum_{x=B}^{X} [\text{if } \langle a, x \rangle \text{ is involved in } k, \text{ then '1' else '0'}]}$$

wherein:
a represents the first network subject;
b represents the second network subject; and
k represents the respective network social behavior type.

11. The method as recited in claim 9, further comprising calculating the respective frequency of the respective network social behavior type by using a formula $$\langle \text{network social behavior frequency} \rangle = \frac{\log Num\langle a, b\rangle[k]}{\log \sum_{x=b}^{x} \sum_{k=0}^{n} Num\langle a, x\rangle[k]}$$

wherein:
a represents the first network subject;
b represents the second network subject;
n represents a total number of social behavior types between the first network subject and the second network subject;
k represents the respective network social behavior type;
Num<a, b>[k] represents a number of occurrence times of the respective social behavior K between the first network subject and the second network subject; and
an antilogarithm portion of a denominator represents a total number of occurrence times between the first network subject and all other network subjects.

12. The method as recited in claim 9, comprising classifying the respective social relationship into a sub-type according to one or more factors including a data range of the social relationship strength index of the second network subject relative to the first network subject in the respective social relationship.

13. An apparatus for alleviating a need of mutual operation during a process of determining a social relationship type among network subjects, the apparatus comprising:

an obtaining unit that obtains network social behavior data of the network subjects whose social relationship type is to be determined;

a discretizing unit that discretizes a respective network social behavior type into multiple levels;

a calculating unit that calculates a respective conditional probability that a respective level of the respective network social behavior type corresponds to a respective social relationship type and calculates a respective merged probability of the respective social relationship type between the network subjects according to the respective conditional probability;

a strength calculating unit that calculates a respective weight of the respective network social behavior type based on a ratio of a total network subjects contacted by a respective network subject to a number of contacts with which the respective network subject has the respective network social behavior type; and an initial estimating unit that automatically determines a social relationship type based, at least in part, on:
 a largest merged probability as an initial estimate of the social relationship type between the network subjects, and
 the respective weight of the respective network social behavior type.

14. The apparatus as recited in claim 13, further comprising:

an initial sample data set obtaining unit that obtains data including existing network social behavior data of existing network subjects whose social relationships are known as an initial sample data set;

a level dividing unit that discretizes the respective network social behavior type in the existing network social behavior data into the multiple levels according to a quantity range of the respective network social behavior type in the existing network social behavior data; and a conditional probability calculating unit that calculates the respective conditional probability that the respective level of the respective network social behavior type corresponds to the respective social relationship type according to the data in the initial sample data set.

15. The apparatus as recited in 13, wherein the quantity range of the respective network social behavior type is a range of a number of occurrence times of the respective network social behavior type.

16. The apparatus as recited in claim 13, further comprising a final estimating unit that determines the social relationship type with the largest merged probability as a final estimate of the social relationship type between the network subjects in response to determining that the largest merged probability is larger than a preset threshold value.

17. The apparatus as claimed in claim 16, further comprising a preset threshold value determining unit that:
 obtains a required accuracy for an initial sample data set;
 calculates a merged probability of respective network subjects in the initial sample data set;
 chooses a particular value as a hypothetical threshold value;
 estimates a social relationship type of the respective network subjects;
 compares an estimated result with a real social relationship in the initial sample data set to obtain an accuracy of the estimated result to determine the preset threshold value; and
 using the particular value as the preset threshold value in response to determining that the accuracy of the estimated result is equal to or substantially equal to the required accuracy.

18. The apparatus as recited in claim 13, wherein the strength calculating unit is further configured to calculate a social relationship strength index of a second network subject relative to a first network subject in the respective social relationship type according to the respective weight of the respective network social behavior type and a respective frequency of the respective network social behavior type.

19. The apparatus as recited in claim 18, further comprising a social relationship classifying unit that classifies the respective social relationship into a sub-type according to one or more factors including a data range of the social relationship strength index of the second network subject relative to the first network subject in the respective social relationship.

20. One or more memories stored thereon computer-executable instructions executable by one or more processors to perform operations for alleviating a need of mutual operation during a process of determining a social relationship type among network subjects, the operations comprising:

obtaining network social behavior data of the network subjects whose social relationship type is to be determined;

discretizing a respective network social behavior type into multiple levels;

calculating a respective weight of the respective network social behavior type based on a ratio of total network subjects contacted by a respective network subject to a number of contacts with which the respective network subject has the respective network social behavior type;

calculating a respective conditional probability that a respective level of the respective network social behavior type corresponds to a respective social relationship type;

calculating a respective merged probability of the respective social relationship type between the network subjects according to the respective conditional probability;

determining a social relationship type with a largest merged probability as an initial estimate of a social relationship type between the network subjects; and automatically determining the social relationship type based, at least in part, on:
 the largest merged probability as a final estimate of the social relationship type between the network subjects in response to determining that the largest merged probability is larger than a preset threshold value, and
 the respective weight of the respective network social behavior type.

* * * * *